US006507854B1

(12) United States Patent
Dunsmoir et al.

(10) Patent No.: US 6,507,854 B1
(45) Date of Patent: Jan. 14, 2003

(54) ENHANCED NETWORK CACHING AND MIRRORING SYSTEM

(75) Inventors: John W. Dunsmoir, Round Rock, TX (US); Sandra H. Jacobs, Austin, TX (US); Christopher Daniel Reech, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,007

(22) Filed: Nov. 5, 1999

(51) Int. Cl.[7] ............................................... G06F 17/24
(52) U.S. Cl. ................... 707/501.1; 707/203; 709/213; 709/223
(58) Field of Search ............................ 707/203, 501.1; 345/744, 355; 709/213, 223

(56) References Cited

U.S. PATENT DOCUMENTS

| | | | | | |
|---|---|---|---|---|---|
| 5,821,927 A | * | 10/1998 | Gong | .......................... | 345/335 |
| 6,021,426 A | * | 2/2000 | Douglis et al. | ............. | 709/200 |
| 6,094,662 A | * | 7/2000 | Hawes | ....................... | 707/104 |
| 6,112,321 A | * | 8/2000 | DeSimone et al. | ......... | 709/213 |
| 6,167,438 A | * | 12/2000 | Yates et al. | .................. | 709/216 |
| 6,182,133 B1 | * | 1/2001 | Horvitz | ...................... | 709/223 |
| 6,185,598 B1 | * | 2/2001 | Farber et al. | ............... | 709/200 |
| 6,243,089 B1 | * | 6/2001 | Gong | .......................... | 345/355 |
| 6,243,760 B1 | * | 6/2001 | Armbruster et al. | ........ | 709/201 |
| 6,324,584 B1 | * | 11/2001 | Mandalia | .................... | 709/217 |

OTHER PUBLICATIONS

Google.com, "Interpreting Google result", Apr. 23, 1999, Available at http://web1.archive.org/web/19990423185917/www.google.com/legend.html.*

CacheFlow Inc. "Instant web Hosting with Cacheflow Internet Caching Applicances", White paper, Oct. 1999.*

CacheFlow Inc. "Accelerating E–Commerce with Cache-Flow Internet Caching Applicances", White page, Oct. 1999.*

Datasheet for NetApp C700, posted at http://www.netapp.com, Oct. 28, 1999, by Network Appliances, Inc., pp. 1 through 2.

"Caching 101: The Basics", posted at http://www.netapp.com/products/netchache/caching101.html, Oct. 22, 1999, by Network Appliances, Inc., pp. 1 through 2.

"Cisco Cache Engine 500 Series", posted at http://www.cisco.com, $cds_{13}$ ov.htm, Oct. 22, 1999, by Cisco Systems, Inc., pp. 1 through 10.

* cited by examiner

Primary Examiner—John Breene
Assistant Examiner—Khanh B. Pham
(74) Attorney, Agent, or Firm—Robert H. Frantz; David A. Mims, Jr.

(57) ABSTRACT

A Program product code, a method, and a deviceare disclosed for an enhanced caching and mirroring router which modifies stored web pages in order to indicate the age, time of capture, and which allows requests for a new copy of the page. By incorporating an HTML modification Java servlet into the caching router, the caching router can efficiently merge the cached web pages with local data objects, such time stamps and age counters, in a real-time manner, thereby providing the receiving user with an indication of the time and/or age of the cached page, where there would otherwise be no indication to the user of the age of the web page. In an enhancement of the invention, a method is provided to detect a refresh request from the user in order to fetch a new, current copy of the cached page.

30 Claims, 2 Drawing Sheets

ENHANCED NETWORK CACHING AND MIRRORING SYSTEM

BACKGROUND OF THE INVENTION

1. Field of the Invention

This invention pertains to the arts of electronic web site technology, and especially to the technologies of web site mirroring and caching.

2. Description of the Related Art

As described in the related application, the use of the World Wide Web ("WWW") has grown dramatically and is expected to continue to grow as more businesses, government agencies, educational institutions, and private consumers become web users and web site owners. As network usage grows, Internet network bandwidth management has become an art of its own.

FIG. 1 shows the basic prior art topology of Internet servers, routers, and client browser systems. A web site server typically consists of a server computer (1), a local data storage for original site content (2), and a data interface (3) between the local data storage (2) and the server computer (1). Often, the local data storage is simply a file system on the disk subsystem of the server computer, but in the cases of very large web sites, this local storage may be another network file server. In the former case, the data interface (3) is typically a high-speed computer bus such as Small Computer System Interface ("SCSI"). In the latter case, the data interface (3) may be a 100 Megabit/second Ethernet. The web site server computer (1) usually includes necessary software suites, such as a web server suite and web communications package (e.g. TCP/IP stack), and possibly some security or firewall software. Finally, the web server interfaces to the World Wide Web (5), or Internet, through a data interface (4) such as a dial-up modem, T1 data line, or through a router over a local area network ("LAN"). Stored in the local data storage (2) are web pages, typically in Hyper Text Markup Language ("HTML"), and all related web objects used in those pages, such as graphics image files (e.g. GIF and JPEG files), video clips (e.g. AVI files), audio clips (e.g. WAV files). This type of web server architecture is well-known within the art, as are all of the above-mentioned web object types.

At the other end of the "connection" are web browser computers (14). A web browser computer typically uses a local data interface (10), such as a dial-up modem or LAN, to interface to a local bridge or router (9), in the case of a corporate facility. The local bridge or router (9) relays Hyper Text Transfer Protocol ("HTTP") requests received from the web browser (14) to an Internet Service Provider point-of-presence ("ISP POP") via an upstream data connection (8) such as another dial-up modem, cable modem or T1 data line. The ISP POP router (7) relays the HTTP requests for documents to another upstream data connection (6) which reaches the backbone of the Internet (5). Routers within the Internet (5) relay the HTTP requests to the appropriate web site server based on Domain Name Service ("DNS") and Universal Resource Locator ("URL") addressing schemes. The web site server computer (1) retrieves the page and web objects requested from its local data storage (2), and transmits them using the HTTP protocol through the Internet (5), ISP POP router (7), local router (9), to the web browser computer (14). This arrangement and the technologies used to achieve this are well-known within the art, too.

A problem arises in bandwidth management the further "upstream" in the network that a piece of equipment is located. For example, the local bridge or router (9) may serve ten's to even hundred's of browser systems. So, the data bandwidth sending and receiving on its upstream connection (8) to the ISP POP router (7) is the aggregation of the individual bandwidths of the downstream web browser systems. This aggregation occurs again at the ISP POP router level, as the ISP POP router (7) may server many local downstream routers, so the data bandwidth requirements on the ISP POP router's upstream link (6) is the aggregation of all the bandwidth demands of all the downstream local routers.

The most unsophisticated way to deal with this problem is to increase the data rates of the data interfaces on the upstream connections both at the ISP POP and at the local routers and bridges. However this is very expensive, and is only a temporary remedy as web site content is increasing in data size as web page content is quickly migrating from primarily text and still graphic files towards text with audio and video clips. Additionally, this approach does not relieve a "bottle neck" problem which appears at the web site server data interface (4). If this interface is relatively slow for the number of requests, or "hits", it receives, the response to the web browsers will be slow even though the other downstream data links are high speed.

To address this problem, a number of Internet equipment manufacturers have introduced caching routers, such as the Cisco Cache Engine 500 Series and the NetApp C700 series from Network Appliance, Inc. Basically, a caching router is an enhanced router which incorporates its own local data storage. Based on "hit trends" on certain web sites and pages, the processor (11) in the caching router decides to store in its own local data storage (12) temporary copies of the pages being frequently requested. When those cached pages are requested again by a client downstream, the caching router retrieves the cached copy from its local storage (12) and transmits it to the requesting browser. This eliminates duplicate requests for the same page going upstream to the web server, and eliminates retransmission of the page from the server downstream through the routers (7 and 9) to the browser (14). The apparent response time of the web server is decreased and improved, as well. These kinds of caching routers are commonly deployed at any point of aggregation of bandwidth in the network, including corporate routers and bridges between the ISP connection and the corporate area networks, and ISP POP routers between the Internet backbone connections and the downstream links to end users.

One problem that arises with the use of caching routers is that the data may become stale over time. Most caching routers' algorithms have configurable retention times, after which a page is automatically deleted and a new, fresh copy is retrieved and stored from the origin web server on the next request. This allows the caching router to automatically manage its depository of copied pages, deleting in time any pages which are not requested very often and storing those which become requested at a greater frequency.

However, the person receiving the cached page at the web browser computer is typically not aware that the page was cached and may not be up-to-date. The cached page contains no indication of when it was fetched from the original web server, and contains no indication of how long it has resided in the router's cache. While in many cases, this may not be problematic, in many other cases it is a serious problem. For example, consider a day trader who is using a particular web site to retrieve "live" stock quotes or news releases as they occur. If he requests a web page which is very popular, it is likely he will receive a cached copy of the page instead of a fresh, up-to-date copy from the original web server. This may be more misleading than the case without a caching router, too. If the router were not caching, the response to the page request may take considerable time, seconds or even minutes, which would give some indication to the user that the data may not be very current. But, with the caching router, the response may be almost instantaneous, which may lead the user to think it is very current.

Besides possible copyright issues that may arise with the unauthorized temporary copying of the original web site into the caching router into its memory, the web site operator may believe he or she is suffering economic loss because his attempts to deliver near-real-time information via the Internet are experiencing interference by the caching routers, none of which is being notified or announced to either the end user or the web site operator.

Therefore, there is a need in the art for an improved caching method and mechanism for web pages which allows notification of the caching time or period to the end user. There exists an additional requirement for an improved caching device which allows an end user to request a fresh or current copy of a cached page in order to allow requests from time-relevant web sites to be honored and processed appropriately. There exist strong technical and marketing needs for this enhanced caching method and mechanism to be implemented in technologies which are compatible with currently deployed web server, router and bridge technologies.

BRIEF DESCRIPTION OF THE DRAWINGS

The following detailed description when taken in conjunction with the figures presented herein present a complete description of the present invention.

SUMMARY OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The invention provides a method and device for a caching router to modify cached web pages in order to indicate the age, time of capture, and to allow requests for a new, current copy of the page. By using the Boson servlet, described in the related application, incorporated into the caching router, the caching router can efficiently merge the cached web pages with local data objects in a real-time manner. With this enhancement, the caching router can merge the cached web page into a new template which includes all of the information from the original page plus a time stamp and/or a notice on how to request a new copy of the page. Since the Boson servlet is preferably implemented as a Java servlet, it is suitable for integration into a number of caching server platforms, including platforms from Cisco, Sun Microsystems, IBM, and Microsoft, running a variety of operating systems and software suites for routing, firewalls, and bridging.

DETAILED DESCRIPTION OF THE INVENTION

The preferred embodiment of the invention is to realize the enhanced cahching and mirroring router system in conjunction with a suitable web server or caching router computer platform, such as an IBM RS/6000 computer platform running a suitable operating system and web tool software suite, such as the IBM AIX operating system and the IBM WebSphere Application Server product. Alternative computer platforms, web server software, and operating systems such as Microsoft NT or IBM OS/2, and IBM-compatible personal computers or Sun workstations, can be utilized, as well. Since the Boson/Quark technology described in the related application is preferably realized as a Java servlet, many web server platforms will meet the technical requirements of the invention at hand.

As described in the related application, the Boson servlet receives two inputs: (1) an HTML page to be used as a layout template, and (2) a set of web objects for insertion into the template. Boson first extracts the object definitions and document format definitions, such as table, list, radio button, background, and font definitions, and creates a template in a set of string variables. Then, Boson maps data objects, which it receives from the controlling or calling process, into the extracted format, creating a new HTML page output.

Figure 1:
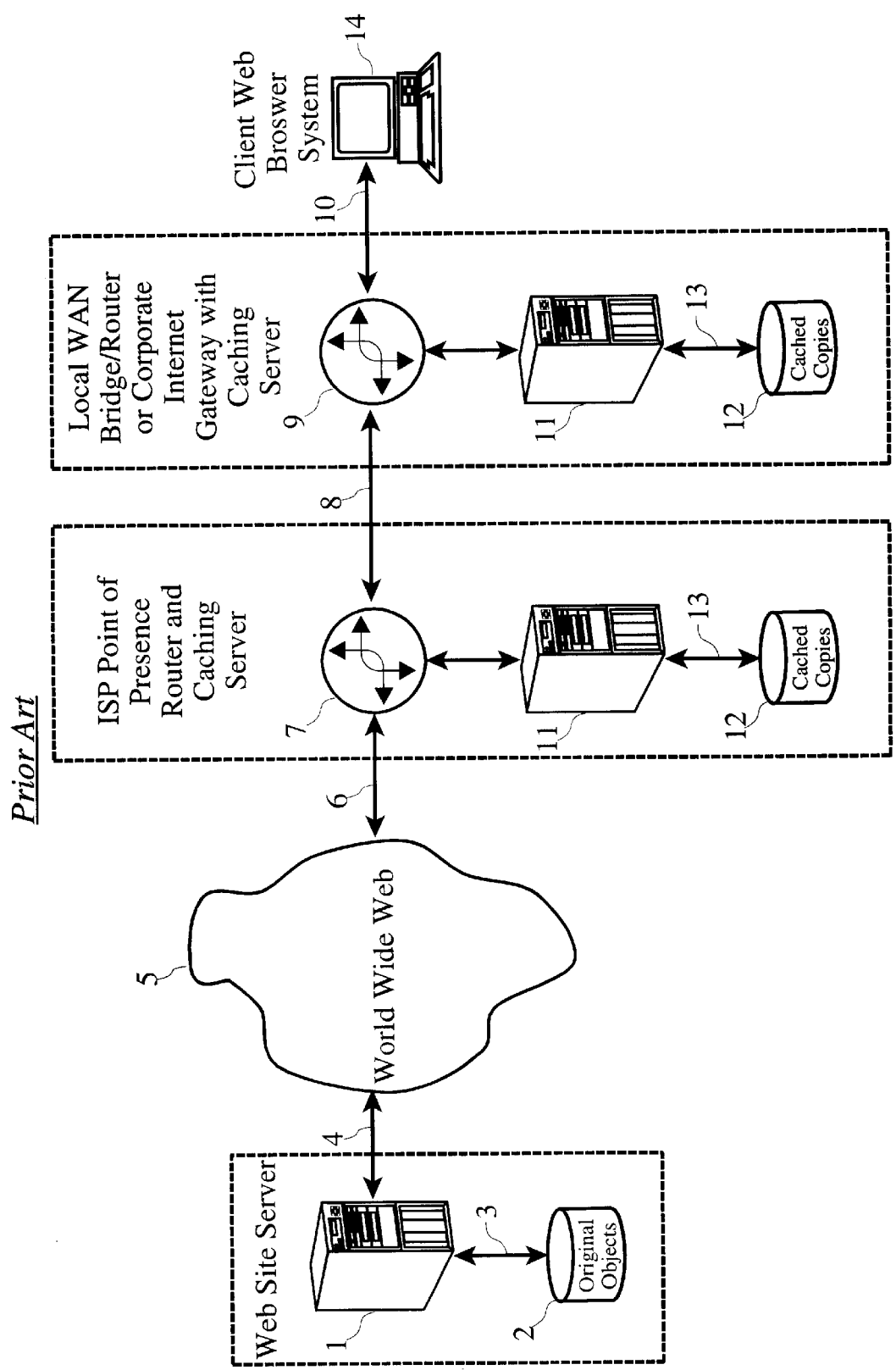
FIG. 1 shows the prior art arrangement and relationship between Internet browser systems, routers, bridges, caching routers, the Internet or World Wide Web, and web site servers.
Figure 2:
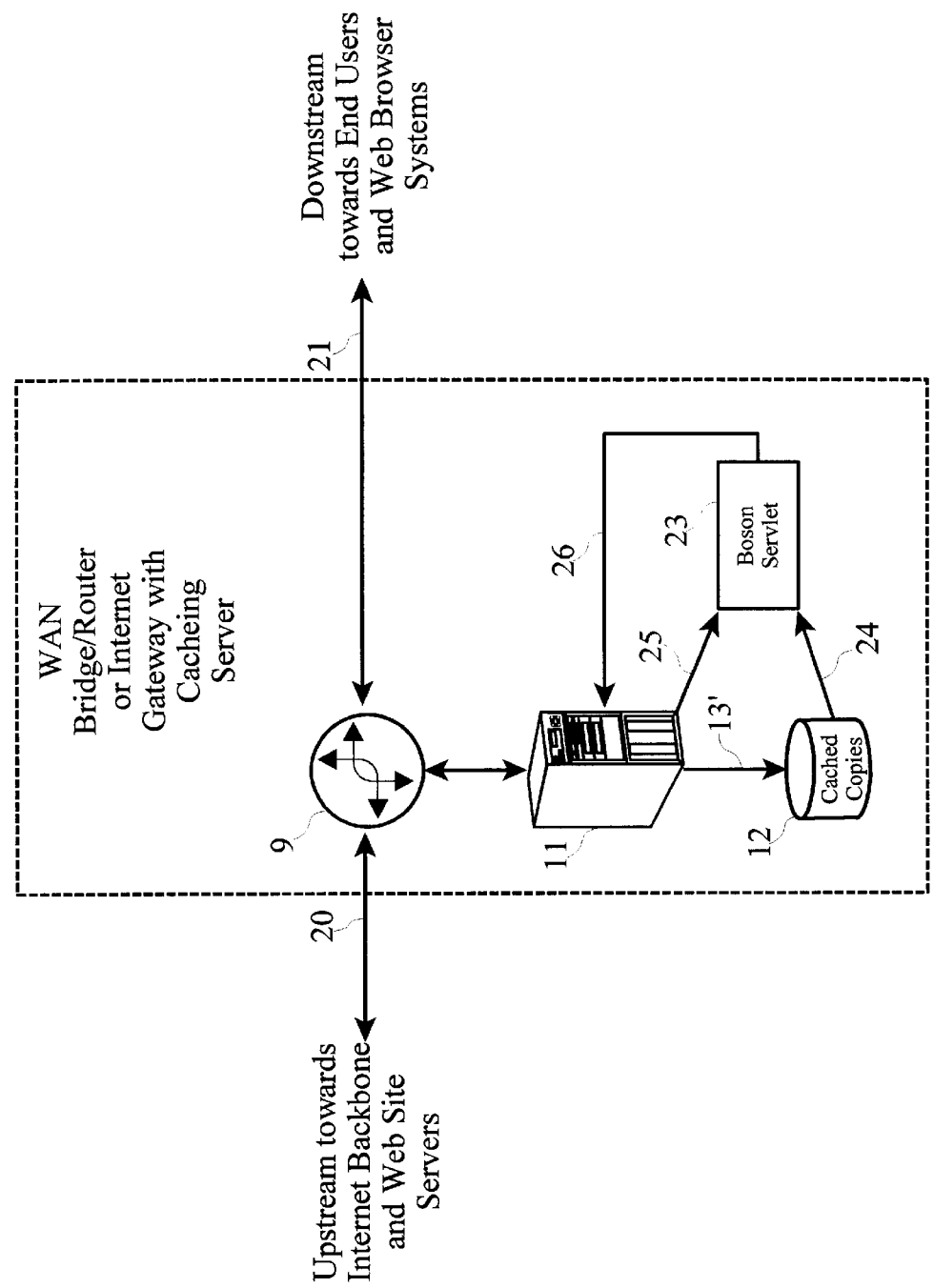
FIG. 2 illustrates the enhanced caching router architecture of the invention.

FIG. 2 shows the architecture of the enhanced caching router. As shown, the process of storing and retrieving pages (13') to and from local memory (12) is modified such that in general pages are only stored directly from the caching engine (11) into the local memory (12). When the caching engine (11) detects a subsequent request for the same web page from the different requester, the caching engine (11) uses the Boson servlet (23) to merge a marking template (25) with the cached page copy (24). Table 1 shows an example of a HTML template which could be used as the marking template.

TABLE 1

Example Marking Template

<HTML><HEAD>
<META NAME="Marking Template">
<TITLE>First parameter is the title</TITLE></HEAD>
<BODY TEXT="#000000" LINK="#0000ff" VLINK="#551a8b"
ALINK="#ff0000" BGCOLOR="#ffffff">
<P>Second parameter is the notice of caching</P>
<P>Third parameter is the time or age of the page</P>
<HR WIDTH="100%">
<!-#INCLUDE FILE="cached_file_name">
</BODY></HTML>

Table 2 shows a sample data set in comma-separated variable ("CSV") format which the router engine (11) would also pass to the Boson servlet, with the parameters being defined by the order of the appearance of the data in the template file. For the example given in Table 1, the order of parameters are (1) title of the page, (2) notice of caching, (3) time or age of page, and (4) name of the file to include.

TABLE 2

Example Parameter List for Mapping into the Template

Cached page by MyISP,Notice: This page was cached at, 14:05,cached_index.htm<CR>

Boson is passed this template or the name of the template which it would retrieve (24), and it is passed the parameter string (25) or a name of a text file containing the parameter string. Then, it merges the two to create a new HTML output (26) as shown in Table 3.

TABLE 3

Modified HTML Output File

```
<HTML><HEAD>
<META NAME="Marking Template">
<TITLE>Cached page by MyISP</TITLE></HEAD>
<BODY TEXT="#000000" LINK="#0000ff" VLINK="#551a8b"
ALINK="#ff0000" BGCOLOR="#ffffff">
<P>Notice: This page was cached at</P>
<P>14:05</P>
<HR WIDTH="100%">
** HTML FROM ORIGINAL PAGE HERE cached_index.htm**
</BODY></HTML>
```

When this new merged HTML file is received and displayed by the users browser, it will display at the top of the page content "Cached Page by MyISP; This page was cached at 14:05", followed by a horizontal line, followed by the original HTML text of the cached page.

In an enhanced version of the invention, the caching engine will detect if the same browser repeats the request for the cached page within a few seconds or minutes. If it does, then this would be interpreted as an indication that the user may have requested a "refresh", and the caching engine should retrieve a new copy of the page from the source web server.

In an alternate use of the same combination equipment and functionality, a web site mirroring system can be realized. Web site mirrors hold an entire copy of a web site, and provide an alternate source for data instead of the original web site for disaster recovery and well-controlled network traffic management. Web site mirrors are similar to caching routers in that they store web pages taken from other web sites. However, web site mirrors tend to store the pages longer term, and will usually store all of the pages from another web site. Additionally, web site mirrors do not usually automatically detect frequently requested pages, rather they are configured to mirror certain pages and sites. So, the logic of the caching engine (11) of how and when to retrieve and store a page is somewhat different, but well understood in the art. With the addition of the Boson as described for the caching router, a web site mirroring system can automatically add markings to mirrored pages to allow the user to known which mirror is serving the pages.

As Boson is preferably implemented as a Java servlet, it is ideal for inclusion in most of the prior art caching routers. It will be understood from the foregoing description that various modifications and changes may be made in the preferred embodiment of the present invention without departing from its true spirit, such as the use of alternate programming methodologies or languages, alternate web server platforms, operating systems and development tool sets. It is intended that this description is for purposes of illustration only and should not be construed in a limiting sense. The scope of this invention should be limited only by the language of the following claims.

What is claimed is:

1. A method for a web server for modify cached and mirrored web pages for distribution to and display by web browser systems, said cached and mirrored web pages having format definitions and content definitions, said method comprising the steps of:
    providing a server-side modifying web page template including format definitions, at least one of which format definitions is a web page inclusion command;
    retrieving by said server a server-cached or mirrored web page from a computer readable medium;
    including by said server said retrieved cached or mirrored web page in said modifying web page template to create a new combined web page by extracting object definitions and format definitions from said retrieved web page, creating a set of string variables for those definitions, and mapping data objects into the extracted format to create a modified web page; and
    transmitting said combined web page from said server to a web browser computer via a computer readable medium such that said combined web page is displayed by said web browser computer.

2. A method for modifying cached and mirrored web pages according to claim 1 wherein said step of providing a modifying web page template further comprises providing a time stamp parameter within said modifying web page template, and wherein said step of including said cached web page in modifying web page template further comprises insertion of a time value in said new combined web page.

3. A method for modifying cached and mirrored web pages according to claim 2 wherein said step of insertion of a time value in said combined web page further comprises the step of retrieving a time value at which the web page was cached or mirrored and inserting that value in said combined web page such that when said combined web page is displayed to a user it is apparent when the web page was cached or mirrored.

4. A method for modifying cached and mirrored web pages according to claim 2 wherein said step of insertion of a time value in said combined web page further comprises the step of determining a length of time value during which the web page has been cached or mirrored and inserting that value in said combined web page such that when said combined web page is displayed to a user it is apparent how long the web page has been cached or mirrored.

5. A method for modifying cached and mirrored web pages according to claim 1 wherein said step of providing a modifying web page template further comprises providing a template Hyper Text Markup Language document file embodied in a computer readable medium.

6. A method for modifying cached and mirrored web pages according to claim 1 wherein said step of retrieving a cached or mirrored web page from a computer readable medium further comprises retrieving a cached or mirrored Hyper Text Markup Language document file from a computer readable medium.

7. A method for modifying cached and mirrored web pages according to claim 1 wherein said step of including said cached or mirrored web page in said modifying web page template to create a new combined web page further comprises creating a combined Hyper Text Markup Language document file in a computer readable medium.

8. A method for modifying cached and mirrored web pages according to claim 1 further comprising the steps of:
    determining when a cached or web page has been repeatedly requested from a particular web browser computer within a predetermined amount of time from the delivery of said combined web page;
    requesting and retrieving from a web server a current copy of said cached or mirrored web page; and
    transmitting said current copy of said cached web page to said particular web browser computer via a computer readable medium such that said current copy is displayed by said web browser computer.

9. A method for modifying cached and mirrored web pages according to claim 8 further comprising the step of replacing said cached or mirrored web page with said current copy web page such that subsequent requests from any web browser computer will result in the transmission of the current copy to the requesting web browser computer.

10. An enhanced caching and mirroring web router system for temporarily storing and forwarding cached and mirrored web pages for distribution to and display by requesting web browser systems, said cached and mirrored web pages having format definitions and content definitions, said enhanced caching and mirroring web router comprising:
   a caching and mirroring router engine communicably disposed to send and receive web pages over a computer network in response to requests from a web browser computer, said caching and mirroring engine also being suitably adapted to temporarily store in a router cache web pages which are determined to be commonly requested by web browser computers, further adapted to intercept requests for web page requests from web browser computers for web pages which are currently stored in router cache, and adapted for retrieving said cached or mirrored web pages from said router cache;
   a means operable by said caching and mirroring router engine for modifying said retrieved web pages to include special indicia related to the cached status of the web page by extracting object definitions and format definitions from said retrieved web page, creating a set of string variables for those definitions, and mapping data objects into the extracted format to create a modified web page; and
   a means operable by said caching and mirroring router engine for transmitting from said router engine to said web browser the modified cached or mirrored web pages to a requesting web browser computer such that when said transmitted web page is displayed on said requesting web browser computer, said cached status indicia is readily apparent to a user.

11. An enhanced caching and mirroring web router system according to claim 10 in which said caching and mirroring router engine is adapted for caching and mirroring Hyper Text Markup Language document files.

12. An enhanced caching and mirroring web router system according to claim 10 in which said caching and mirroring router engine is adapted for communications via the Internet.

13. An enhanced caching and mirroring web router system according to claim 10 in which said caching and mirroring router engine is adapted for communications via an intranet.

14. An enhanced caching and mirroring web router system according to claim 10 in wherein said caching and mirroring router engine is adapted for communications via a Local Area Network.

15. An enhanced caching and mirroring web router system according to claim 10 wherein said means for modifying said cached or mirrored web page to include special indicia further comprises a means to create a special indicia stating the time said cached web page was stored.

16. An enhanced caching and mirroring web router system according to claim 10 wherein said means for modifying said cached or mirrored web page to include special indicia further comprises a means to create a special indicia stating the length of time said cached web page has been stored.

17. An enhanced caching and mirroring web router system according to claim 10 wherein said means for modifying said cached or mirrored web pages is adapted for modifying cached and mirrored Hyper Text Markup Language document files.

18. An enhanced caching and mirroring web router system according to claim 17 wherein said means for modifying cached and mirrored Hyper Text Markup Language document files further comprises a means for inserting a cached Hyper Text Markup document file into a modifying template.

19. An enhanced caching and mirroring web router system according to claim 10 wherein said means for modifying said cached or mirrored web pages further comprises a means for creating Hyper Text Markup Language document files.

20. An enhanced caching and mirroring web router system according to claim 10 wherein said means for transmitting said modified cached or mirrored web pages to a requesting web browser computer further comprises a means for transmitting Hyper Text Markup Language document files over the Internet.

21. An enhanced caching and mirroring web router system according to claim 10 wherein said means for transmitting said modified cached or mirrored web pages to a requesting web browser computer further comprises a means for transmitting Hyper Text Markup Language document files over an intranet.

22. An enhanced caching and mirroring web router system according to claim 10 wherein said means for transmitting said modified cached or mirrored web pages to a requesting web browser computer further comprises a means for transmitting Hyper Text Markup Language document files over a Local Area Network.

23. A computer program product for use in an enhanced caching and mirroring router system to provide indicia to a web browser computer user that a page has been cached and mirrored, said cached web documents comprising content definitions and layout definitions, said computer program product comprising:
   a computer usable medium having a caching router engine computer readable program code means embodied in said medium for routing requests for web pages from a web browser computer communicably connected to downstream computer network, said requests being routed to a web server computer communicably connected to an upstream computer network, said caching router engine computer readable program code means being adapted to selectively detect frequently requested web pages, to store copies of said frequently requested web pages in a router cache, and to selectively block the forwarding of the web page requests to the upstream web server computer upon detection of a web page request for a stored web page, and said caching router engine program code means being adapted to retrieve from router cache said store web page for which a request was intercepted and to output said web page to a web page output;
   a computer usable medium having a web page modifying computer readable program code means embodied in said medium for receiving said retrieved web pages from said web page output of said caching router engine computer readable program code means, said web page modifying computer code means being adapted to modify said retrieved web page to include special cached status indicia by extracting object definitions and format definitions from said retrieved web page, creating a set of string variables for those definitions, and mapping data objects into the extracted format to create a modified web page, and outputting said modified web page to a modified web page output; and
   a computer usable medium having a web page transmission computer readable program code means embodied in said medium for receiving said modified web page from said modified web page output, and for transmitting said modified web page from said router engine to said requesting web browser computer such that when said modified web page is displayed on said web browser computer, the special cached status indicia is apparent to a user.

24. A computer program product for use in an enhanced caching and mirroring router system according to claim 23 wherein said caching router engine computer readable program code means is adapted for routing and caching Hyper Text Markup Language document files over the Internet.

25. A computer program product for use in an enhanced caching and mirroring router system according to claim 23 wherein said caching router engine computer readable program code means is adapted for routing and caching Hyper Text Markup Language document files over an intranet.

26. A computer program product for use in an enhanced caching and mirroring router system according to claim 23 wherein said caching router engine computer readable program code means is adapted for routing and caching Hyper Text Markup Language document files over a Local Area Network.

27. A computer program product for use in an enhanced caching and mirroring router system according to claim 23 wherein said web page modifying computer readable program code means is adapted to receive, modify, and output Hyper Text Markup Language document files.

28. A computer program product for use in an enhanced caching and mirroring router system according to claim 23 wherein said web page transmission computer readable program code means is adapted for transmission of Hyper Text Markup Language document files over the Internet.

29. A computer program product for use in an enhanced caching and mirroring router system according to claim 23 wherein said web page transmission computer readable program code means is adapted for transmission of Hyper Text Markup Language document files over an intranet.

30. A computer program product for use in an enhanced caching and mirroring router system according to claim 23 wherein said web page transmission computer readable program code means is adapted for transmission of Hyper Text Markup Language document files over a local area network.

* * * * *